United States Patent [19]

McClure

[11] Patent Number: 5,448,965
[45] Date of Patent: Sep. 12, 1995

[54] ELEVATED INSULATED PET SHELTERS

[76] Inventor: Richard F. McClure, 117 Tuscawilla Hills, Charles Town, W. Va. 25414

[21] Appl. No.: 257,175

[22] Filed: Jun. 9, 1994

[51] Int. Cl.$^6$ .............................................. A01K 1/03
[52] U.S. Cl. ................................................... 119/19
[58] Field of Search ............... 119/19, 21, 28.5, 15, 119/847

[56] References Cited

U.S. PATENT DOCUMENTS

| | | | |
|---|---|---|---|
| 1,941,662 | 1/1934 | Cunningham | 119/19 |
| 2,002,259 | 5/1935 | Cole | 119/19 |
| 2,034,156 | 3/1936 | Snider | 119/15 |
| 2,795,208 | 6/1957 | Rasmussen | 119/19 |
| 3,797,461 | 3/1974 | Breeden | 119/19 |
| 4,021,975 | 5/1977 | Calkins | 119/19 |
| 4,962,729 | 10/1990 | Barreto et al. | 119/19 |
| 5,115,762 | 5/1992 | Long | 119/19 |
| 5,121,710 | 6/1992 | Gonzalez | 119/19 |

FOREIGN PATENT DOCUMENTS 94494 2/1939 Sweden ................................. 119/19

OTHER PUBLICATIONS

Sibley, "Quonset Hut for Your Dog", *Popular Mechanics*, Aug. 1946, p. 185.

Primary Examiner—Todd E. Manahan

[57] ABSTRACT

An elevated insulated pet shelter comprises a main housing unit formed as a hollow generally rectangular shaped box with a front wall, a back wall, two side walls, a floor and a roof. The front wall includes a large aperture which extends therethrough. Four legs are formed as long solid, generally rectangular shaped blocks and are positioned vertically in the operative orientation. The uppermost extent of the legs includes coupling devices to permit affixation to the floor of the main housing unit. An entrance tunnel is formed in a long hollow configuration with a first open end and a second open end. The first open end is affixed to the front wall of the housing unit around the periphery of its aperture. The second open end is adapted to be positioned with its lowermost extent resting upon the ground. The uppermost extent of the second open end is positioned slightly higher than the lowermost extent of the first open end. The remainder of the tunnel is positioned in an angled orientation between the open ends.

5 Claims, 4 Drawing Sheets

ELEVATED INSULATED PET SHELTERS

BACKGROUND OF THE INVENTION

1. Field of the Invention

The present invention relates to elevated insulated pet shelters and more particularly pertains to housing pets in an elevated shelter with an entrance tunnel adapted for thermal efficiency.

2. Description of the Prior Art

The use of pet houses is known in the prior art. More specifically, pet houses heretofore devised and utilized for the purpose of providing shelter for animals are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,099,794 to Pearce a house for pet cats.

U.S. Pat. No. 4,021,975 to Calkins discloses a pet house.

U.S. Pat. No. 3,797,461 to Breeden discloses a pet house.

U.S. Pat. No. Des. 289,450 to Jennings discloses a pet house.

Lastly, U.S. Pat. No. Des. 296,596 to Taylor discloses a pet house.

In this respect, the elevated insulated pet shelters according to the present invention substantially depart from the conventional concepts and designs of the prior art, and in doing so provide an apparatus primarily developed for the purpose of housing pets in an elevated shelter with an entrance tunnel adapted for thermal efficiency.

Therefore, it can be appreciated that there exists a continuing need for new and improved elevated insulated pet shelters which can be used for housing pets in an elevated shelter with an entrance tunnel adapted for thermal efficiency. In this regard, the present invention substantially fulfills this need.

SUMMARY OF THE INVENTION

In view of the foregoing disadvantages inherent in the known types of pet houses now present in the prior art, the present invention provides improved elevated insulated pet shelters. As such, the general purpose of the present invention, which will be described subsequently in greater detail, is to provide a new and improved elevated insulated pet shelter and method which has all the advantages of the prior art and none of the disadvantages.

To attain this, the present invention essentially comprises a new and improved elevated insulated pet shelter including a main housing unit fabricated of plastic and formed as a hollow generally rectangular shaped box with a front wall, a back wall, two side walls, a floor and an open top. Each of the walls are formed in a planar configuration and have a horizontal width larger than their vertical height. The front wall has parallel vertical side edges and parallel horizontal side edges. The front wall includes a large centrally located, generally rectangular shaped aperture which spans the majority of its height and width. The parallel vertical side edges of the aperture each include long convex, generally elliptical shaped projections which extend therefrom. The back wall has parallel vertical side edges and parallel horizontal side edges. The back wall has a shorter vertical height than the front wall. The side walls are positioned between the front and back walls and include an angled top edge. The highest vertical point of the top edge is positioned in a generally perpendicular orientation against the upper horizontal edge of the front wall. The lowest vertical point of the top edge is positioned in a generally perpendicular orientation against the upper horizontal edge of the back wall. The top edge of the side walls has a gradually deceasing height between the front and back walls. The interior of the main housing unit includes insulated material positioned against the walls and floor. Each of the four corners of the floor includes a generally rectangular shaped aperture. The interior of each corner of the housing unit includes a generally rectangular shaped hollow leg box. The floor of the leg box is open and formed contiguously with the side edges of the rectangular apertures. A removable roof is fabricated of plastic and formed in a generally planar rectangular configuration with an upper surface and a lower surface. The roof has long parallel side edges and short parallel side edges. The roof has a length and width larger than the top of the housing unit. All of the side edges include downwardly oriented ledges. The lower surface includes insulated material affixed thereto. The roof is positioned upon the top of the housing unit with its plane following the angled contour of the top edge of the sidewalls in the operative orientation. The roof is adapted to be easily removed by the user when entering the housing unit is desired. Four legs are fabricated of plastic and formed as long solid, generally rectangular shaped blocks. The blocks have an upper end and a lower end. The blocks stand vertically in the operative orientation with their upper ends positioned within the leg boxes in the corners of the housing unit. The legs are adapted to support the apparatus above the ground in the operative orientation. An entrance tunnel is fabricated of plastic and formed as a long hollow generally rectangular shaped box with a first open end and a second open end. Each open end has parallel horizontal side edges and parallel vertical side edges. The tunnel has a larger height and width than the aperture in the front wall of the housing unit. Each of the parallel vertically positioned side edges of the first open end include long concave, generally elliptical shaped grooves which are adapted to be coupled with the convex projections in the front wall of the main housing unit. A second open end is adapted to be positioned with its lowermost horizontal edge resting upon the ground. In the attached operative orientation, the uppermost horizontal edge of the second open end is positioned at a height slightly lower than the lowermost horizontal edge of the first open end. The remainder of the tunnel is positioned in an angled orientation between the first and second open ends. The interior of the tunnel includes insulated material affixed thereto. The configuration of the tunnel is adapted to permit the unhindered entrance and exit of a pet, while also preventing the escape of heat from the apparatus.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved elevated insulated pet shelters which have all the advantages of the prior art pet houses and none of the disadvantages.

It is another object of the present invention to provide new and improved elevated insulated pet shelters which may be easily and efficiently manufactured and marketed.

It is further object of the present invention to provide new and improved elevated insulated pet shelters which are of durable and reliable constructions.

An even further object of the present invention is to provide new and improved elevated insulated pet shelters which are susceptible of a low cost of manufacture with regard to both materials and labor, and which accordingly are then susceptible of low prices of sale to the consuming public, thereby making such elevated insulated pet shelters economically available to the buying public.

Still yet another object of the present invention is to provide new and improved elevated insulated pet shelters which provide in the apparatuses and methods of the prior art some of the advantages thereof, while simultaneously overcoming some of the disadvantages normally associated therewith.

Still another object of the present invention is to house pets in an elevated shelter with an entrance tunnel adapted for thermal efficiency.

Lastly, it is an object of the present invention to provide a new and improved elevated insulated pet shelter comprising a main housing unit formed as a hollow generally rectangular shaped box with a front wall, a back wall, two side walls, a floor and a roof. The front wall includes a large aperture which extends therethrough. Four legs are formed as long solid, generally rectangular shaped blocks and are positioned vertically in the operative orientation. The uppermost extent of the legs includes coupling devices to permit affixation to the floor of the main housing unit. An entrance tunnel is formed in a long hollow configuration with a first open end and a second open end. The first open end is affixed to the front wall of the housing unit around the periphery of its aperture. The second open end is adapted to be positioned with its lowermost extent resting upon the ground. The uppermost extent of the second open end is positioned slightly higher than the lowermost extent of the first open end. The remainder of the tunnel is positioned in an angled orientation between the open ends.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
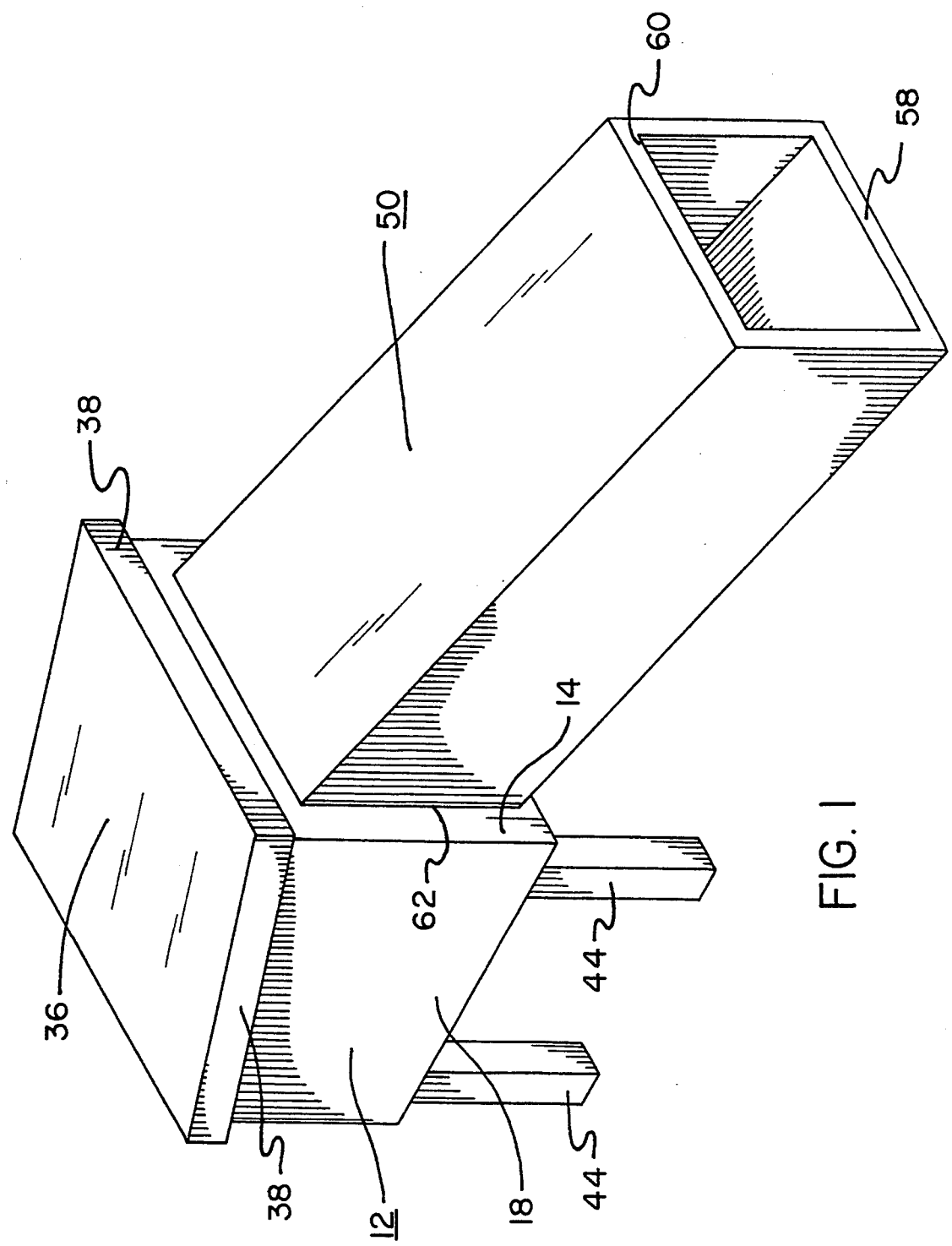
FIG. 1 is a perspective view of the preferred embodiment of the elevated insulated pet shelter constructed in accordance with the principles of the present invention.
Figure 2:
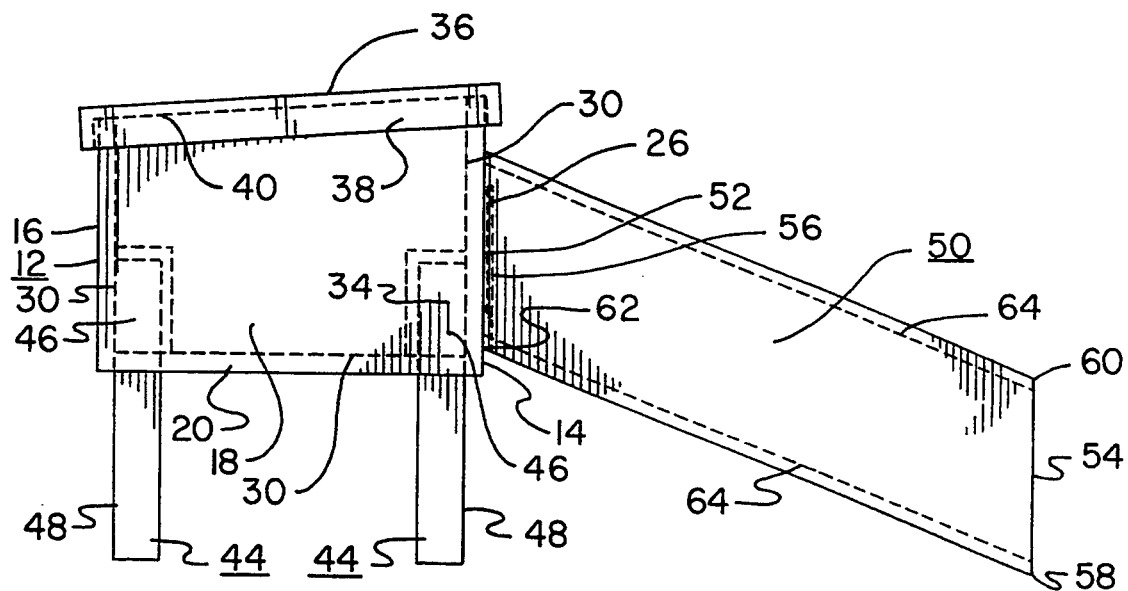
FIG. 2 is a side perspective view of the apparatus shown in FIG. 1.
Figure 3:
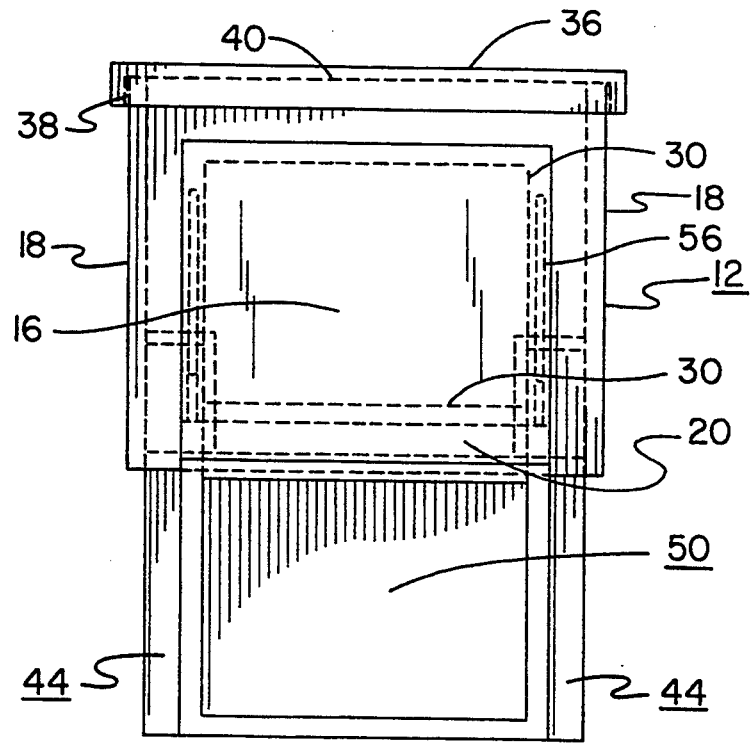
FIG. 3 is a rear perspective view of the apparatus shown in FIG. 1.
Figure 4:
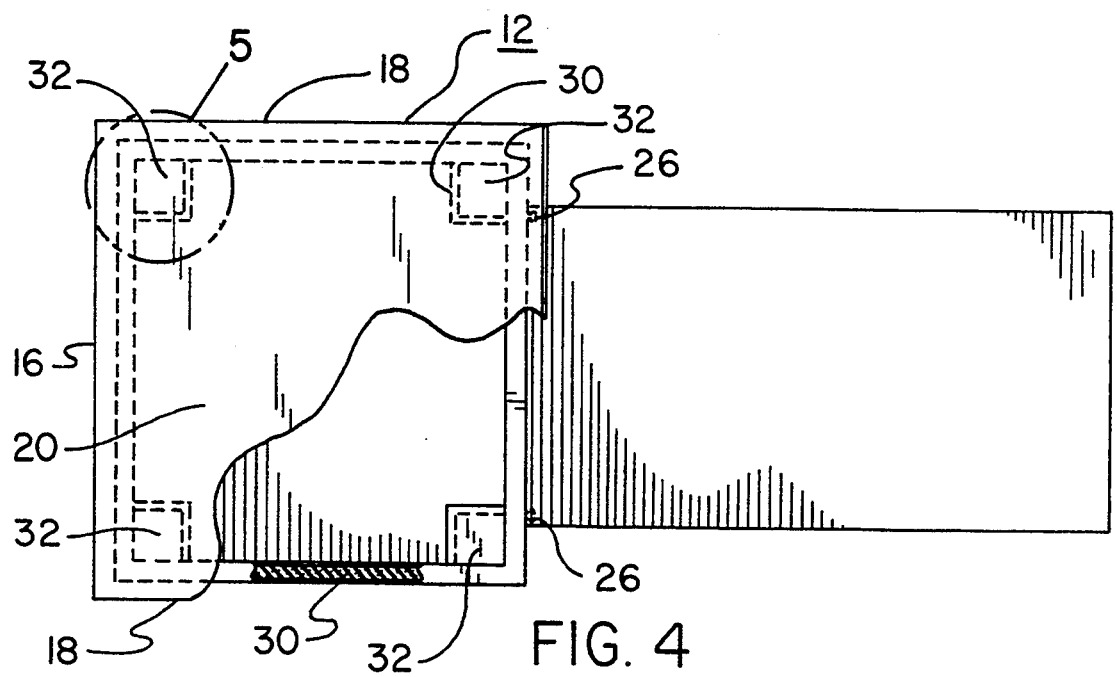
FIG. 4 is a bottom perspective view of the apparatus shown in FIG. 1.
Figure 5:
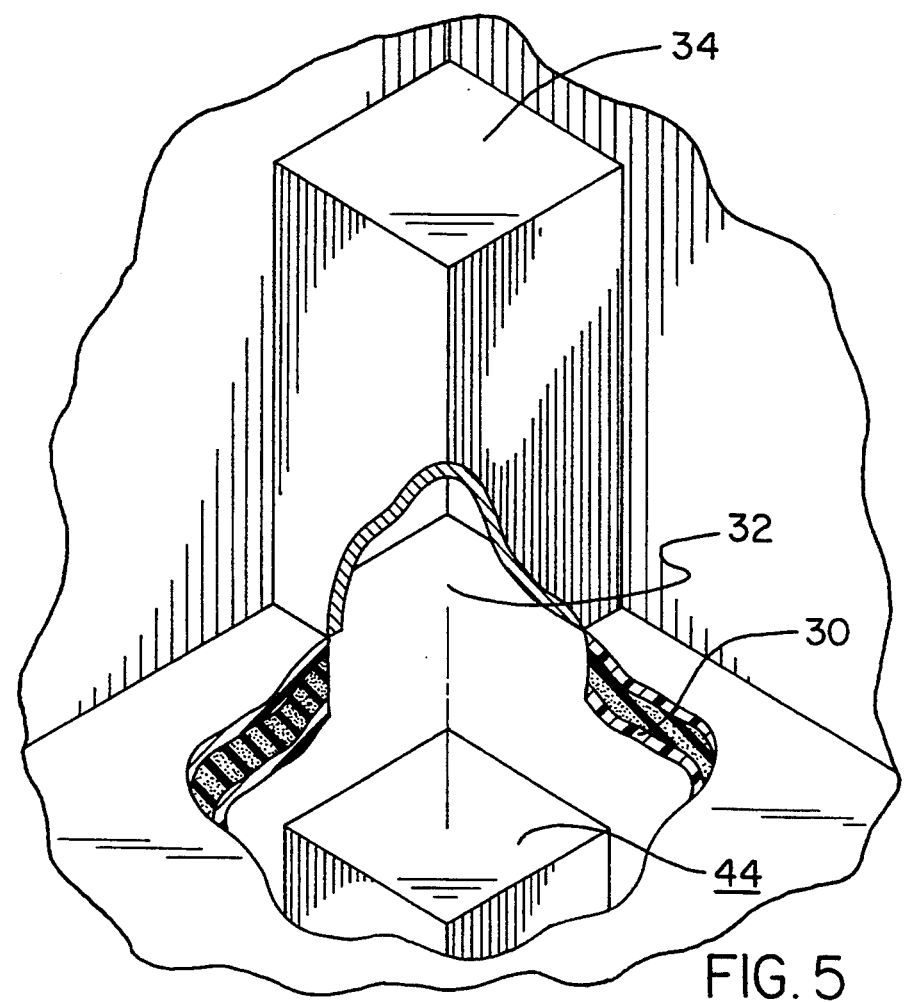
FIG. 5 is a broken away cross-sectional view of the apparatus taken along line 5—5 of FIG. 4 illustrating one of the hollow leg boxes positioned in each corner of the housing unit.
Figure 6:
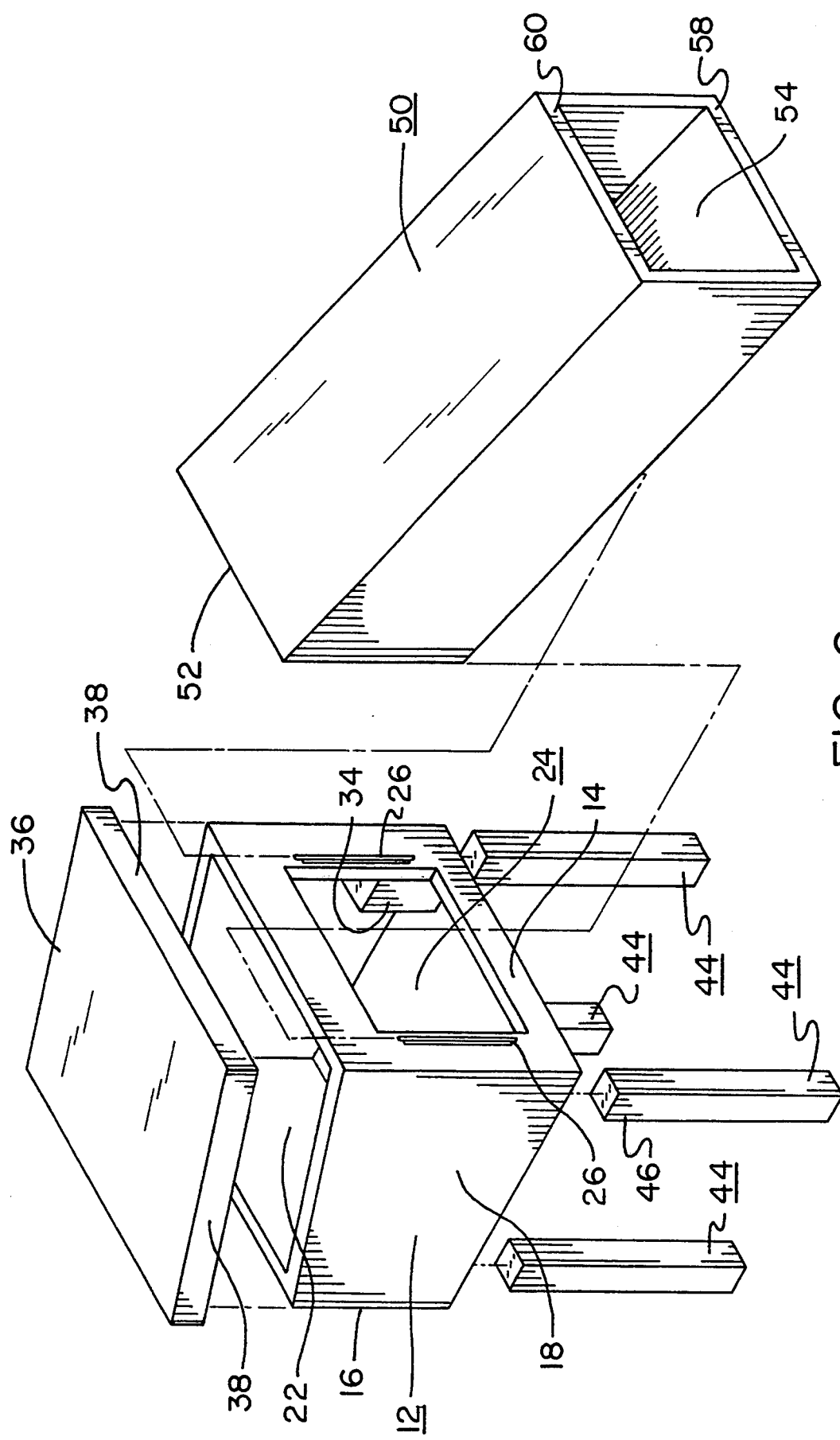
FIG. 6 is a separated front perspective view of the apparatus illustrating the positioning of the various components of the elevated insulated pet shelter.

With reference now to the drawings, and in particular to FIG. 1 thereof, the preferred embodiment of the new and improved elevated insulated pet shelters embodying the principles and concepts of the present invention and generally designated by the reference numeral 10 will be described.

Specifically, it will be noted in FIGS. 1 through 6, that there is provided a new and improved elevated insulated pet shelter. The elevated insulated pet shelter 10, in its broadest context, comprises a main housing unit 12, a removable roof 36, four legs 44 and an entrance tunnel 50.

More specifically, the main housing unit 12 is fabricated of plastic and formed as a hollow generally rectangular shaped box with a front wall 14, a back wall 16, two side walls 18, a floor 20 and an open top 22. Each of the walls are formed in a planar configuration and have a horizontal width larger than their vertical height. The housing unit is comprised of sturdy materials in order to endure the wear and tear of outdoor use. The front wall has parallel vertical side edges and parallel horizontal side edges. The front wall includes a large centrally located, generally rectangular shaped aperture 24 which spans the majority of its height and width. There is a short distance between the floor and the lower edge of the aperture. Animals experience no difficulty traveling through the aperture and into the housing unit, and vice versa. The parallel vertical side edges of the aperture each include long convex, generally elliptical shaped projections 26 which extend therefrom. The projections permit coupling of accessories to the main housing unit. The back wall 16 has parallel vertical side edges and parallel horizontal side edges. The back wall has a shorter vertical height than the front wall. Note FIGS. 2 and 6.

The side walls are positioned between the front and back walls and include an angled top edge. The highest vertical point of the top edge is positioned in a generally perpendicular orientation against the upper horizontal edge of the front wall. The lowest vertical point of the top edge is positioned in a generally perpendicular orientation against the upper horizontal edge of the back wall. The top edge of the side walls has a gradually deceasing height between the front and back walls. The side walls are firmly affixed to the front and back walls forming very sturdy corners for the apparatus. The strength of the corners is very important since the apparatus will be supported at the corners. Note FIGS. 1, 2 and 4.

The interior of the main housing unit includes insulated material 30 positioned against the walls and floor. The insulated material helps retain the animals body heat within the housing unit. Each of the four corners of the floor includes a generally rectangular shaped aperture 32. The interior of each corner of the housing unit includes a generally rectangular shaped hollow leg box 34. The floor of each leg box is open and formed contiguously with the side edges of the rectangular apertures 32. Each leg box is constructed of sturdy plastic and surrounded by insulated materials. Note FIGS. 2 and 4.

A removable roof 36 is fabricated of plastic and formed in a generally planar rectangular configuration with an upper surface and a lower surface. The roof has long parallel side edges and short parallel side edges. The roof has a length and width larger than the top of the housing unit. All of the side edges include downwardly oriented ledges 38. The lower surface includes insulated material 40 affixed thereto. The insulated material helps retain the animals body heat within the housing unit. The roof is positioned upon the top of the housing unit with its plane following the angled contour of the top edge of the sidewalls in the operative orientation. The slanted configuration aids the utility of the apparatus by causing rain and other precipitation to easily roll or slide off. The roof is adapted to be easily removed by the user when entering the housing unit is desired. Cleaning of the apparatus can be accomplished quite effortlessly when the roof is removed. Note FIG. 6.

Four legs 44 are fabricated of plastic and formed as long solid, generally rectangular shaped blocks. The legs are comprised of sturdy plastic and can easily support the weight of the apparatus as well as the animals which may be housed therein. The legs have an upper end 46 and a lower end 48. The legs stand vertically in the operative orientation with their upper ends 46 positioned within the leg boxes 34 in the corners of the housing unit. The legs fit snugly within the leg boxes to add stability to the apparatus. Note FIGS. 5 and 6. The legs 44 are adapted to support the apparatus above the ground in the operative orientation. The elevated positioning of the apparatus aids retention of heat by keeping the housing unit away from the cold, damp ground during outdoor use. Note FIGS. 1 and 2.

An entrance tunnel 50 is fabricated of plastic and formed as a long hollow generally rectangular shaped box with a first open end 52 and a second open end 54. Each open end has parallel horizontal side edges and parallel vertical side edges. The tunnel has a larger height and width than the aperture in the front wall of the housing unit. Each of the parallel vertically positioned side edges of the first open end include long concave, generally elliptical shaped grooves 56 which are adapted to be coupled with the convex projections 26 in the front wall of the main housing unit. The tunnel can be removed and reattached to the main housing unit quite easily. The tunnel fits snugly around the periphery of the aperture to ensure retention of heat within the housing unit. Note FIGS. 1 and 6.

A second open end 54 is adapted to be positioned with its lowermost horizontal edge 58 resting upon the ground. In the attached operative orientation, the uppermost horizontal edge 60 of the second open end is positioned at a height slightly lower than the lowermost horizontal edge 62 of the first open end. The remainder of the tunnel is positioned in an angled orientation between the first and second open ends. The height of the upper edge of the second open end is an important aspect of the apparatus. Since the height of the upper edge is lower than the lower edge of the first open end, rising heated air becomes trapped within the apparatus. This heat trap design causes the animals body heat to be retained within the apparatus, thereby raising the interior temperature. The interior of the tunnel includes insulated material 64 affixed thereto. The insulated material helps retain the animals body heat within the housing unit. The configuration of the tunnel is adapted to permit the unhindered entrance and exit of a pet, while also preventing the escape of heat from the apparatus. Note FIGS. 2 and 3.

The elevated insulated pet shelter offers a way to keep pets warm who are not allowed inside the home. It features a special design that allows a pet's body heat to generate enough body heat to keep the inside of the pet house comfortable for the animal during the cold winter season. By comparison, many pet houses are cold and drafty, with perhaps some minimal protection against the wind but not much else. Pets that use the apparatus will notice a real difference.

The product consists of an enclosed main housing unit raised up on four legs. Leading up to it from ground level and connecting with the compartment is an entrance tunnel. The tunnel features an invisible door which is a heat trap design that effectively keeps cold air out and warm air in. In addition, there is rigid insulation affixed to the interior walls, floor and ceiling of the main housing unit. The product will be made entirely of a colorful molded plastic.

The legs, main compartment, roof, and tunnel are all detachable into separate parts. This facilitates cleaning and storage during the warmer seasons. The product can be made in various sizes for cats, dogs, and other pets. For those pet owners who want the additional comfort for their animals, this product provides much more than just the token protection offered by most pet houses.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved elevated insulated pet shelter comprising, in combination:
   a main housing unit fabricated of plastic and formed as a hollow generally rectangular shaped box with a front wall, a back wall, two side walls, a floor and an open top, each of the walls being formed in a planar configuration and having a horizontal width larger than their vertical height, the front wall having parallel vertical side edges and parallel horizontal side edges, the front wall including a large centrally located generally rectangular shaped aperture spanning the majority of its height and width, the parallel vertical side edges of the aperture each including long convex generally elliptical shaped projections extending therefrom, the back wall having parallel vertical side edges and parallel horizontal side edges, the back wall having a shorter vertical height than the front wall, the side walls being positioned between the front and back walls and including an angled top edge, the highest vertical point of the top edge being positioned in a generally perpendicular orientation against the upper horizontal edge of the front wall, the lowest vertical point of the top edge being positioned in a generally perpendicular orientation against the upper horizontal edge of the back wall, the top edge of the side walls having a gradually deceasing height between the front and back walls, the interior of the main housing unit including insulated material positioned against the walls and floor, each of the four corners of the floor including a generally rectangular shaped aperture, the interior of each corner of the housing unit including a generally rectangular shaped hollow leg box, the floor of the leg box being open and formed contiguous with the side edges of the rectangular apertures;
   a removable roof fabricated of plastic and formed in a generally planar rectangular configuration with an upper surface and a lower surface, the roof having long parallel side edges and short parallel side edges, the roof having a length and width larger than the top of the housing unit, all of the side edges including downwardly oriented ledges, the lower surface including insulated material affixed thereto, the roof being positioned upon the top of the housing unit with its plane following the angled contour of the top edge of the sidewalls in the operative orientation, the roof adapted to be easily removed by the user when entering the housing unit is desired;
   four legs fabricated of plastic and formed as long solid generally rectangular shaped blocks, the blocks having an upper end and a lower end, the blocks standing vertically in the operative orientation with their upper ends positioned within the leg boxes in the corners of the housing unit, the legs adapted to support the apparatus above the ground in the operative orientation; and
   an entrance tunnel fabricated of plastic and formed as a long hollow generally rectangular shaped box with a first open end and a second open end, each open end having parallel horizontal side edges and parallel vertical side edges, the tunnel having a larger height and width than the aperture in the front wall of the housing unit, each of the parallel vertically positioned side edges of the first open end including long concave generally elliptical shaped grooves adapted to be coupled with the convex projections in the front wall of the main housing unit, a second open end adapted to be positioned with its lowermost horizontal edge resting upon the ground, in the attached operative orientation, the uppermost horizontal edge of the second open end being positioned at a height slightly lower than the lowermost horizontal edge of the first open end, the remainder of the tunnel being positioned in an angled orientation between the first and second open ends, the interior of the tunnel including insulated material affixed thereto, the configuration of the tunnel being adapted to permit the unhindered entrance and exit of a pet, while also preventing the escape of heat from the apparatus.

2. An elevated insulated pet shelter comprising:
   a main housing unit formed as a hollow generally rectangular shaped box with a front wall, a back wall, two side walls, a floor and a roof, the interior of the roof, floor and sides including insulated material affixed thereto, the front wall including a large aperture extending therethrough, the height of the front wall being higher than the height of the back wall with a gradually decreasing height therebetween.
   four legs formed as long solid generally rectangular shaped blocks and positioned vertically in the operative orientation, the uppermost extent of the legs including coupling devices to permit affixation to the floor of the main housing unit; and
   an entrance tunnel formed in a long hollow configuration with a first open end and a second open end, the first open end being affixed to the front wall of the housing unit around the periphery of its aperture, the second open end adapted to be positioned with its lowermost extent resting upon the ground, the uppermost extent of the second open end being positioned slightly lower than the lowermost extent of the first open end, the remainder of the tunnel being positioned in an angled orientation between the open ends, the interior of the tunnel including insulated material affixed thereto, the configuration of the tunnel adapted to permit the unhindered entrance and exit of a pet, while also preventing the escape of heat from the apparatus.

3. The apparatus as set forth in claim 2 wherein the roof is removable and formed in a generally planar rectangular configuration, the roof including coupling devices to permit releasable coupling to the top of the housing unit.

4. The apparatus as set forth in claim 2 wherein the front wall of the main housing unit includes coupling means positioned around the periphery of its aperture with the entrance tunnel being removable therefrom, with at least one open end of the tunnel including coupling devices positioned around its periphery to permit releasable coupling with the main housing unit.

5. The apparatus as set forth in claim 2 wherein the uppermost extent of the open end positioned on the ground being located at a height between about one and six inches above the lowermost extent of the open end coupled to the main housing unit.

* * * * *